(12) United States Patent
Yasbek et al.

(10) Patent No.: US 11,226,236 B2
(45) Date of Patent: Jan. 18, 2022

(54) CONTROLLED-EMISSIVITY FACE HEATED BY NON-RESISTIVE HEAT SOURCE

(71) Applicant: HEWLETT-PACKARD DEVELOPMENT COMPANY, L.P., Houston, TX (US)

(72) Inventors: Joshua Peter Yasbek, Vancouver, WA (US); Todd Goyen, Vancouver, WA (US); David Soriano Fosas, Vancouver, WA (US); Asa Weiss, Vancouver, WA (US); Arthur H. Barnes, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 731 days.

(21) Appl. No.: 16/074,896

(22) PCT Filed: Apr. 21, 2017

(86) PCT No.: PCT/US2017/028866
§ 371 (c)(1),
(2) Date: Aug. 2, 2018

(87) PCT Pub. No.: WO2018/194658
PCT Pub. Date: Oct. 25, 2018

(65) Prior Publication Data
US 2021/0199508 A1 Jul. 1, 2021

(51) Int. Cl.
*G01J 5/10* (2006.01)
*G01J 5/06* (2006.01)

(52) U.S. Cl.
CPC . *G01J 5/10* (2013.01); *G01J 5/06* (2013.01); *G01J 2005/063* (2013.01); *G01J 2005/068* (2013.01); *G01J 2005/103* (2013.01)

(58) Field of Classification Search
CPC ........................................................ G01J 5/06
See application file for complete search history.

(56) References Cited

U.S. PATENT DOCUMENTS

| 4,567,353 A | 1/1986 | Aiba |
| 5,530,221 A | 6/1996 | Benda et al. |
| 6,024,487 A | 2/2000 | Gillen et al. |

(Continued)

FOREIGN PATENT DOCUMENTS

| CN | 102620835 A | 8/2012 |
| CN | 105619802 A | 6/2016 |

(Continued)

OTHER PUBLICATIONS

Akole et al., "Thermal Imaging: A Technique for Thermal Analysis of Active Electronic Component". Retrieved from Internet—https://research.ijcaonline.org/ncece2016/number1/ncece29513.pdf, 2016, 5 Pages.

*Primary Examiner* — Yara B Green
(74) *Attorney, Agent, or Firm* — HP Inc. Patent Department

(57) ABSTRACT

In an example, an apparatus is described that includes a non-resistive heat source, a thermally conductive face, and a temperature detector. The thermally conductive face has a controlled long-wave infrared emissivity and is in thermal contact with the non-resistive heat source. The temperature detector is positioned to detect a temperature of the thermally conductive face.

15 Claims, 5 Drawing Sheets

(56) References Cited

U.S. PATENT DOCUMENTS

| | | | |
|---|---|---|---|
| 6,930,278 B1 | 8/2005 | Chung et al. | |
| 7,952,599 B2 | 5/2011 | Zhou et al. | |
| 2002/0146057 A1 | 10/2002 | Barron et al. | |
| 2018/0368212 A1* | 12/2018 | Moreta | H01L 23/345 |
| 2019/0113998 A1* | 4/2019 | Cao | G06F 3/04186 |

FOREIGN PATENT DOCUMENTS

| | | |
|---|---|---|
| DE | 1473235 A | 1/1969 |
| DE | 10346993 A1 | 6/2005 |
| DE | 102012201061 A1 | 1/2013 |
| GB | 1014769 A | 12/1965 |

* cited by examiner

CONTROLLED-EMISSIVITY FACE HEATED BY NON-RESISTIVE HEAT SOURCE

BACKGROUND

Non-contact thermal measurement devices such as thermal cameras are used to provide feedback in systems that generate heat, such as three-dimensional printers and other systems. For instance, by monitoring the heat generated by an object within a system, extreme heating conditions that might otherwise damage the object and/or system can be detected before the damage becomes irreparable.

DETAILED DESCRIPTION

The present disclosure broadly describes a radiometrically characterized, diffusely emitting isothermal radiation source for verifying the measurement accuracy of a non-contact thermal measurement device. As discussed above, non-contact thermal measurement devices such as thermal cameras (i.e., cameras that form images using infrared radiation) are used to provide feedback in systems that generate heat. The accuracy of a non-contact thermal sensor depends on how accurately incident radiation on the sensor (e.g., lens) of the non-contact thermal measurement device can be correlated to an inferred temperature of the monitored object. However, this correlation can be skewed by contamination on the sensor (e.g., dust, powder, or the like on the lens) and/or by thermal aging of the sensor.

Examples of the present disclosure provide an emitter of known or well-described radiation for verifying the accuracy of a non-contact thermal measurement device (e.g., a thermal camera). Examples of the emitter include three layers: a circuit board, an emitter face, and a thermally conductive interface sandwiched between the circuit board and the emitter face. The circuit board includes a non-resistive (e.g., transistor) heat source and a contact-based resistance temperature detector (RTD) placed in proximity with the heat source. The emitter face comprises a plate of material having high thermal conductivity and a controlled, known long-wave infrared emissivity. For instance, the emitter face may comprise aluminum or another highly thermally conductive material whose surface may be roughened and anodized so that a layer of oxide forms. The thermally conductive interface allows heat emitted by the transistor to pass to the emitter face and allows the resultant temperature of the emitter face to be detected by the RTD. By knowing the temperature of the emitter face, one can infer the heat emission value that the non-contact thermal measurement device is expected to be measuring, and can therefore determine whether the value that the non-contact thermal measurement device is actually measuring is within some variance of what it is expected to be measuring.

Figure 1:
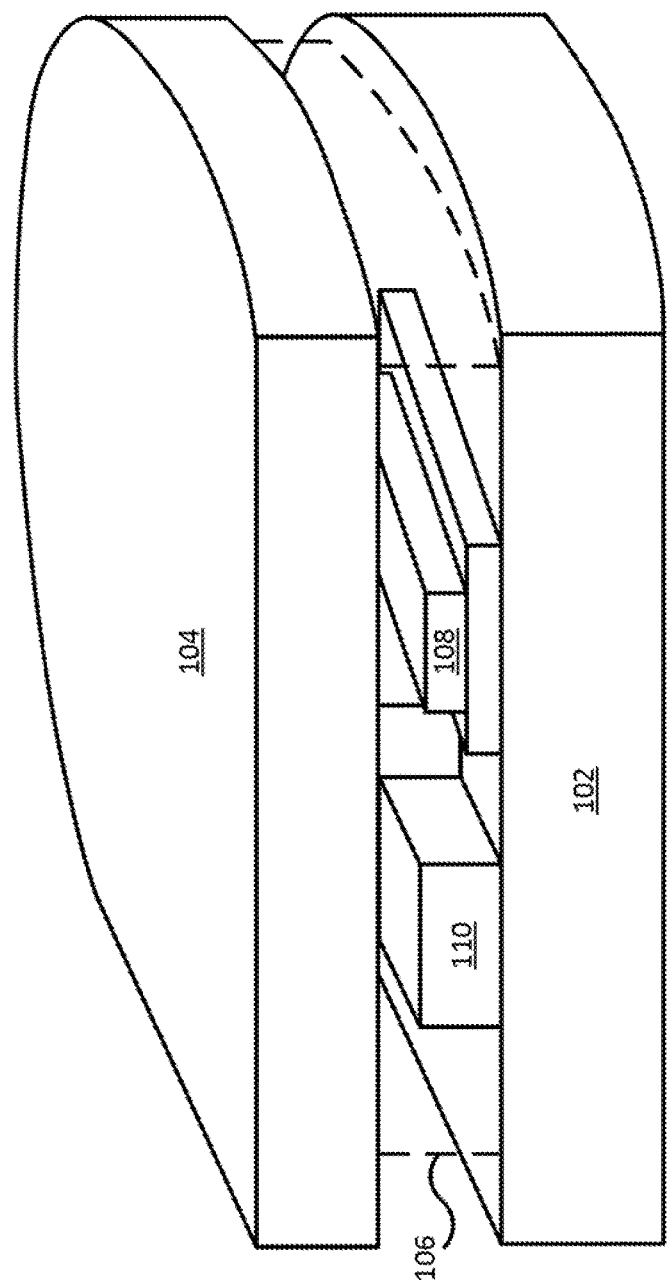
FIG. 1 illustrates an example system of the present disclosure.

FIG. 1 illustrates an example system 100 of the present disclosure. In one example, the system 100 generally comprises three layers: a printed circuit board 102, an emitter face 104, and a thermally conductive (and electrically non-conductive) interface 106 sandwiched between the printed circuit board 102 and the emitter face 104.

The printed circuit board comprises a non-conductive substrate, which may be formed of a rigid material (e.g., glass epoxy, fiberglass, etc.) or a flexible material (e.g., a flexible polyamide) on which one or more layers of copper or other conductive materials are laminated. The printed circuit board 102 mechanically supports and electrically connects a non-resistive heat source 108 and a contact-based temperature detector 110.

In one example, the non-resistive heat source 108 comprises a heat source whose primary means of heat generation is a device other than a resistor, such as a transistor. In one example, the contact-based temperature detector (e.g. sensor) 110 comprises a resistance temperature detector (RTD), a thermistor, a thermocouple, or the like.

The emitter face 104 serves as a heat sink for the non-resistive heat source 108, and the temperature of the emitter face 104 is controlled by the non-resistive heat source 108 as discussed in further detail below. In one example, the emitter face 104 comprises an aluminum plate having known, controlled emissivity. In one example, the emissivity of the emitter face 104 is controlled by roughening and anodizing the aluminum so that a layer of oxide (e.g., of at least a predefined thickness) forms on the external surfaces of the aluminum. In one example, the anodization process is a repeatable process, such as an electrolytic passivation process. In further examples, the emitter face 104 comprises any material having high thermal conductivity (to evenly distribute heat from the non-resistive heat source 108) and capable of being coated or plated with a material of high and known emissivity. The emission of long wave infrared radiation by the resultant emitter face 104 is both diffuse and uniform across the entire surface of the emitter face 104. In one example, the long-wave infrared emission profile of the emitter face 104 may be radiometrically characterized.

As discussed above, the thermally conductive interface 106 is sandwiched between the printed circuit board 102 and the emitter face 104. In one example, the thermally conductive interface 106 comprises a thermally conductive, soft, conformable, and compliant material (e.g., foam, such as ceramic-filled silicon foam) that allows heat to conduct from the non-resistive heat source 108 to the emitter face 104 and from the emitter face 104 to the contact-based temperature detector 110. The thermally conductive interface 106 thus provides thermal contact between the printed circuit board 102 and the emitter face 104 via a wetted conduction path. In a further example, the thermally conductive interface 106 is electrically non-conductive, so as to avoid short circuiting the system 100.

Figure 2:
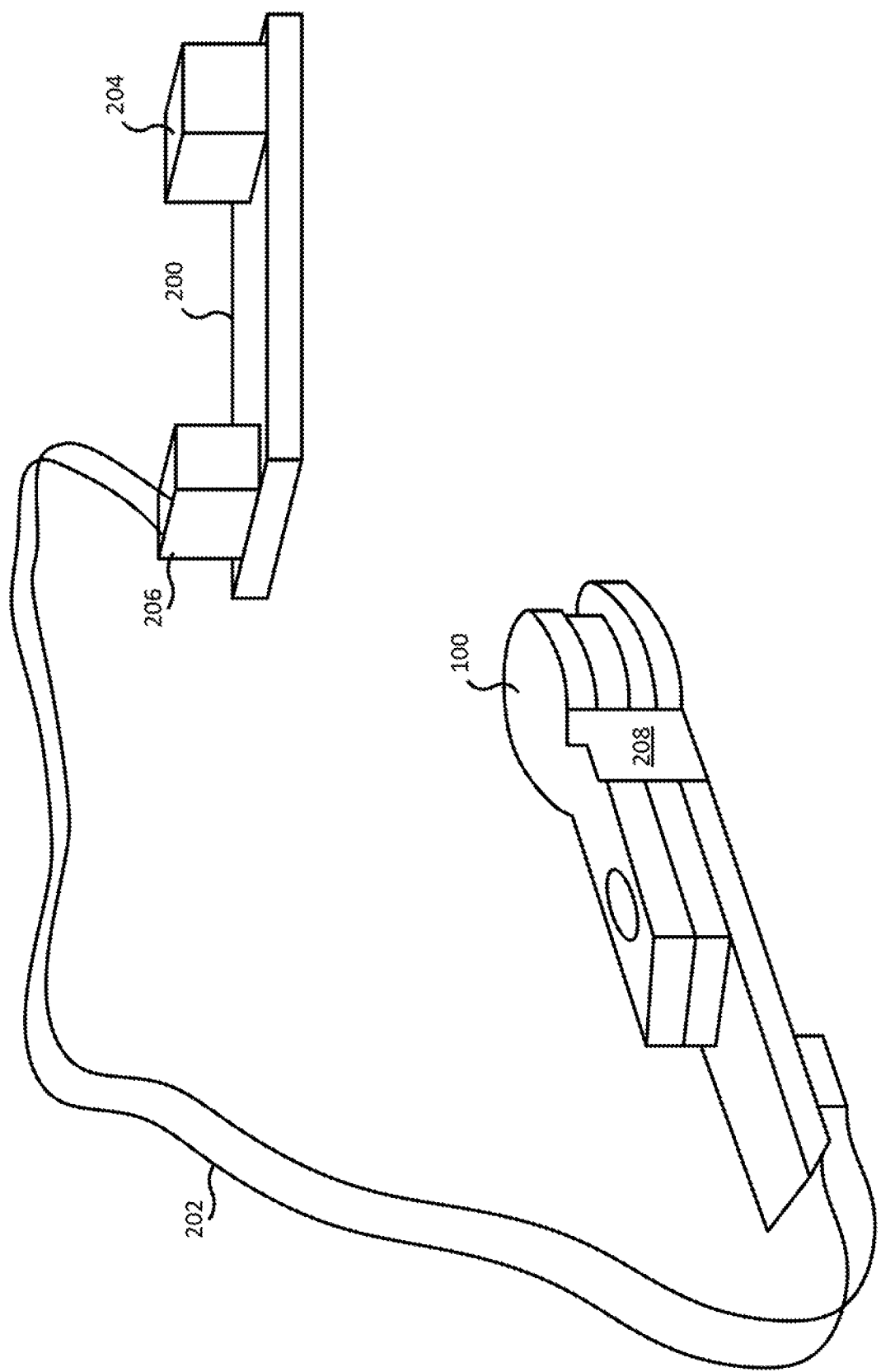
FIG. 2 illustrates the system of FIG. 1 deployed within a portion of a heat generating system, such as a three-dimensional printer, according to an example of the disclosure.

FIG. 2 illustrates the system 100 of FIG. 1 deployed within a portion of a heat generating system, such as a three-dimensional printer (also referred to as an "additive manufacturing system"), according to an example of the present disclosure. In particular, the system 100 is electrically connected, e.g., via a flat, flexible cable 202, to a main control board 200. The main control board 200 mechanically and electrically supports a non-contact thermal measurement device 204, such as a thermal camera. In particular, the main control board 200 controls the functions of the non-contact thermal measurement device 204 (e.g., operation of the shutter, signal extraction and processing, and the like). In addition, in one example, the main control board 200 also controls the system 100, e.g., by controlling the non-resistive heat source 108. In one example, a processor 206 (e.g., a system-on-chip) that is electrically coupled to the main control board 200 controls at least some of the operations of the non-contact thermal measurement device 204 and of the system 100.

As illustrated in FIG. 2, in one example, the system 100 may further comprise a spacer 208. In one example, the spacer 208 is formed of a thermoplastic insulator and is sized and positioned to hold the emitter face 104 flat above the printed circuit board 102. This protects the printed circuit board 102 and its components from overheating due to exposure to the heated emitter face 104.

Referring both to FIGS. 1 and 2, in operation, the non-resistive heat source 108 generates heat that conducts, via the thermally conductive interface 106, to the emitter face 104. The contact-based temperature detector 110, in turn, detects (via the thermally conductive interface 106) the resultant temperature of the emitter face 104. Knowing the temperature of the emitter face 104, one can determine the value that the non-contact thermal measurement device 204 is expected to measure for the heat emission of the emitter face 104 (e.g., the expected value may be related to the temperature of the emitter face 104 in a lookup table). If the measurement of the non-contact thermal measurement device 204 is not within some predefined variance (e.g., three degrees Celsius) of that expected measurement, then the non-contact thermal measurement device 204 may be assumed to be malfunctioning or contaminated, and may be removed for cleaning and/or repairs.

Figure 3:
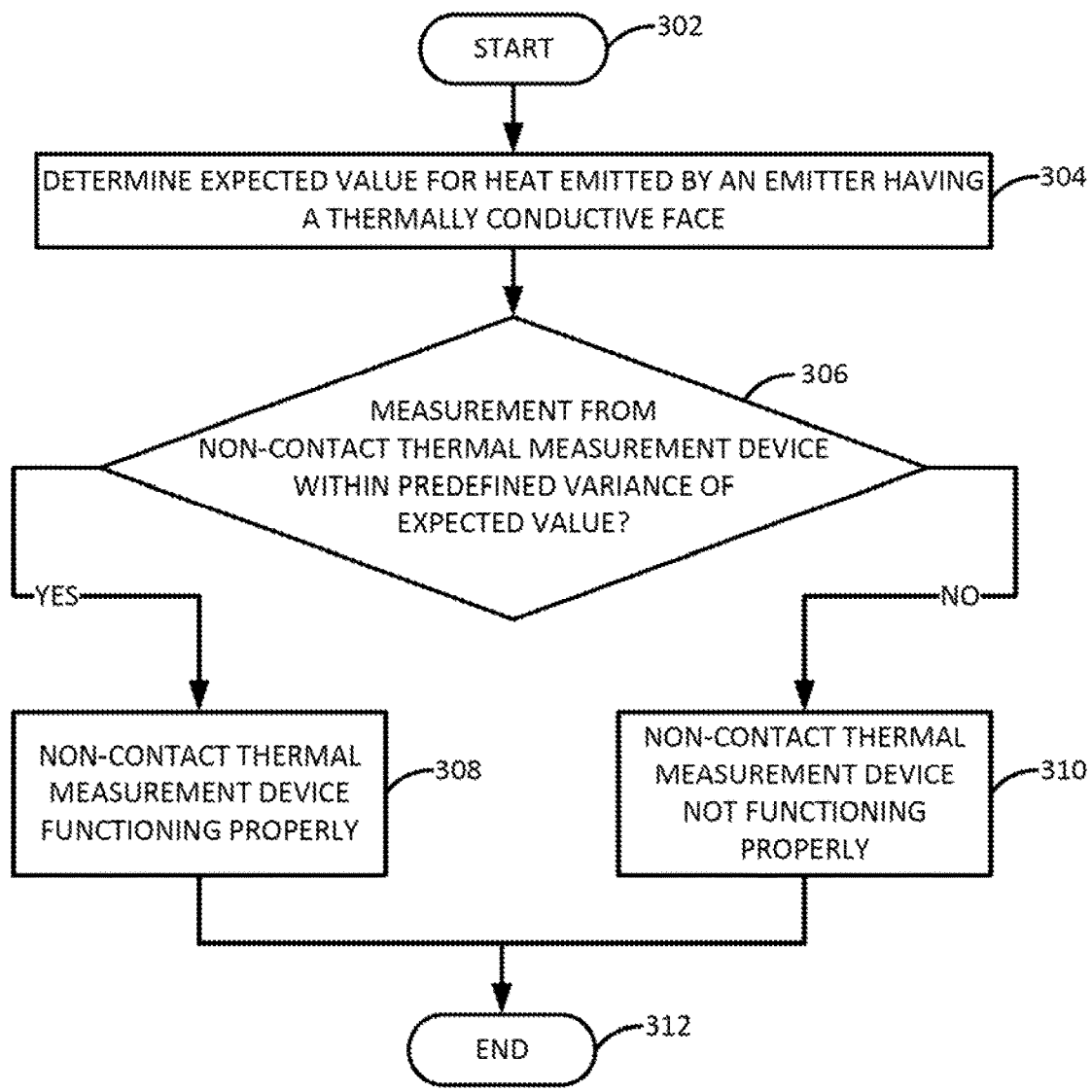
FIG. 3 illustrates a flowchart of a first example method for checking the measurement accuracy of a non-contact thermal measurement device.

FIG. 3 illustrates a flowchart of a first example method 300 for checking the measurement accuracy of a non-contact thermal measurement device, such as a thermal camera. The method 300 may be performed, for example, by the processor 206 illustrated in FIG. 2. It should be noted, however, that the method 300 is not limited to implementation with the system illustrated in FIGS. 1 and 2, and that any references to the components illustrated in FIGS. 1 and 2 are made for the sake of example.

The method 300 begins in block 302. In block 304, an expected value for the heat emitted by an emitter having a thermally conductive face (and a controlled long-wave infrared emissivity) is determined. In one example, the expected value is determined by consulting a lookup table (LUT). Entries in the LUT identify values for the heat emitted by the emitter at different emitter temperatures. For instance, the emitter may be heated by a non-resistive heat source (e.g., a transistor) to a known temperature, and the LUT may provide a heat emission value for the emitter that corresponds to the known temperature.

To obtain the LUT (e.g., prior to performance of the method 300), the emitter surface may be heated with a non-resistive heat source (using a contact-based temperature detector 110 to provide feedback). The emitter surface may then be presented in the field of view of a well-conditioned non-contact thermal measurement device whose proper functioning and calibration have been verified. The non-contact thermal measurement device may then measure the heat emitted by the emitter surface at various temperatures of the emitter surface, and the values measured by the non-contact thermal measurement device may be recorded in the LUT.

In block 306, a measurement taken by a non-contact thermal measurement device of the heat emitted by the emitter is compared to the expected value determined in block 304. The measurement taken by the non-contact thermal measurement device may be delivered to a processor (e.g., the processor 206) in an electronic signal. This comparison determines whether the measurement taken by the non-contact thermal measurement device is within a predefined range or variance of the expected value.

If it is determined in block 306 that the measurement taken by the non-contact thermal measurement device is within the predefined variance of the expected value, then the method 300 proceeds to block 308. In block 308, it is determined that the non-contact thermal measurement device is functioning properly (e.g., accurately measuring temperature). In this case, the non-contact thermal measurement device may remain in the system in which it is deployed.

However, if it is determined in block 306 that the measurement taken by the non-contact thermal measurement device is not within the predefined variance of the expected value, then the method 300 proceeds to block 310. In block 310, it is determined that the non-contact thermal measurement device is not functioning properly (e.g., not accurately measuring temperature). In this case, one may remove the non-contact thermal measurement device for repair and/or cleaning. This may involve at least temporarily shutting down the system in which the non-contact thermal measurement device is deployed. In one example, an alert (e.g., an audible alert, a visible alert, a text or email alert, or the like) may be generated to inform a human operator that the non-contact thermal measurement device is not functioning properly.

The method 300 ends in block 312.

Figure 4:
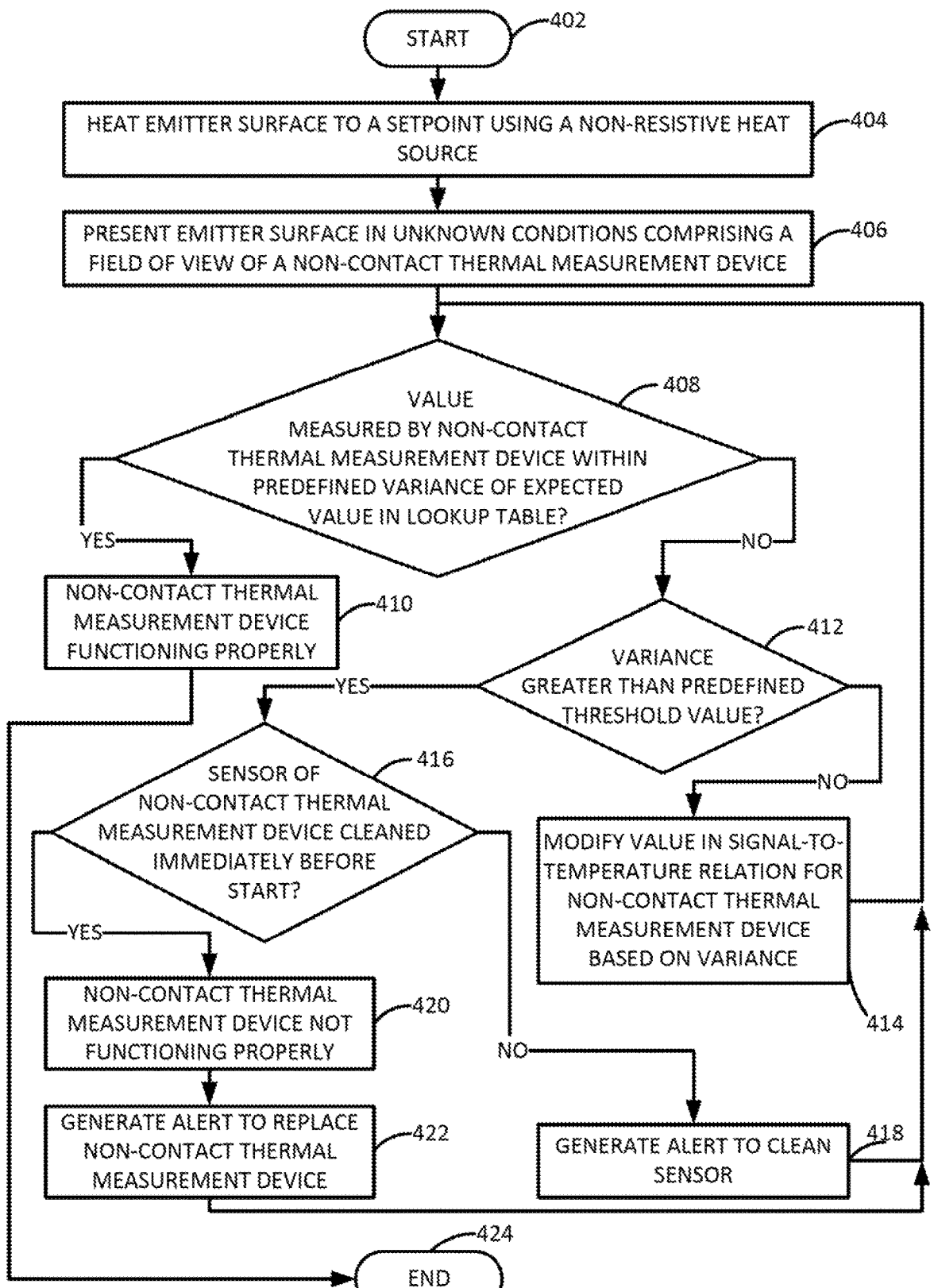
FIG. 4 illustrates a flowchart of a second example method for checking the measurement accuracy of a non-contact thermal measurement device.

FIG. 4 illustrates a flowchart of a second example method 400 for checking the measurement accuracy of a non-contact thermal measurement device, such as a thermal camera. In particular, the method 400 is a more detailed version of the method 300 illustrated in FIG. 3. As such, the method 400 may be performed, for example, by the processor 206 illustrated in FIG. 2. It should be noted, however, that the method 400 is not limited to implementation with the system illustrated in FIGS. 1 and 2, and that any references to the components illustrated in FIGS. 1 and 2 are made for the sake of example.

The method 400 begins in block 402. In block 404, the surface of an aluminum emitter (e.g., emitter face 104) is heated to a setpoint or target value using a non-resistive heat source. In one example, the non-resistive heat source is a transistor (e.g., transistor 108 of FIG. 1). In one example, a contact-based temperature detector (e.g. sensor) 110 is used to provide feedback so that it can be determined when the setpoint is reached.

In block 406, the heated emitter surface is presented in unknown conditions, in the field of view of a non-contact thermal measurement device (e.g., non-contact thermal measurement device 204 of FIG. 2).

In block 408, a value describing the heat emitted by the emitter surface, as measured by the non-contact thermal measurement device, is compared with an expected value in the LUT. This comparison determines whether the measurement made by the non-contact thermal measurement device is within a predefined variance of the expected value in the LUT.

If it is determined in block 408 that measurement made by the non-contact thermal measurement device is within a predefined variance of the expected value in the LUT, then the method 400 proceeds to block 410. In block 410, it is determined that the non-contact thermal measurement device is functioning properly (e.g., accurately measuring temperature). In this case, the non-contact thermal measurement device may remain in the system in which it is deployed, and the method 400 may end in block 424.

However, if it is determined in block 408 that the measurement made by the non-contact thermal measurement device is not within the predefined variance of the expected value in the LUT, then the method 400 proceeds to block 412. In block 412, it is determined whether the variance between the measurement made by the non-contact thermal measurement device and the expected value in the LUT is greater than a predefined threshold.

If it is determined in block 412 that the variance is not greater than the predefined threshold, then the method 400 proceeds to block 414. In block 414, the signal-to-temperature relation of the non-contact thermal measurement device is modified based on the variance. In one example, the modification adjusts the signal-to-temperature relation so that future measurements made by the non-contact thermal measurement device that record the same signal will translate to a temperature value that matches (or is within the predefined variance of) the expected value in the LUT. The method 400 then returns to block 408 to verify that the modification results in the measurements made by the non-contact thermal measurement device being within the predefined variance of the expected value in the LUT.

If, however, it is determined in block 412 that the variance is greater than the predefined threshold, then the method 400 proceeds to block 416. In block 416, it is determined whether the sensor of the non-contact thermal measurement device was cleaned immediately before the start of the method 400. This may be determined by querying a human operator or by consulting a record that indicates when the sensor was cleaned.

If it is determined in block 416 that the sensor of the non-contact thermal measurement device was not cleaned immediately prior to the start of the method 400, then the method 400 proceeds to block 418. In block 418, an alert (e.g., an audible alert, a visible alert, a text or email alert, or the like) is generated instructing a human operator or an automatic system to clean the sensor. The method 400 then returns to block 408 to verify that cleaning of the sensor results in the measurements made by the non-contact thermal measurement device being within the predefined variance of the expected value in the LUT.

If, however, it is determined in block 416 that the sensor of the non-contact thermal measurement device was cleaned immediately prior to the start of the method 400, then the method 400 proceeds to block 420. In block 420, it is determined that the non-contact thermal measurement device is not functioning properly (e.g., not accurately measuring temperature).

In block 422, an alert (e.g., an audible alert, a visible alert, a text or email alert, or the like) is generated instructing a human operator or an automatic system to replace the non-contact thermal measurement device. The method 400 then returns to block 408 to verify that replacing the non-contact thermal measurement device results in the measurements made by the non-contact thermal measurement device being within the predefined variance of the expected value in the LUT.

Figure 5:
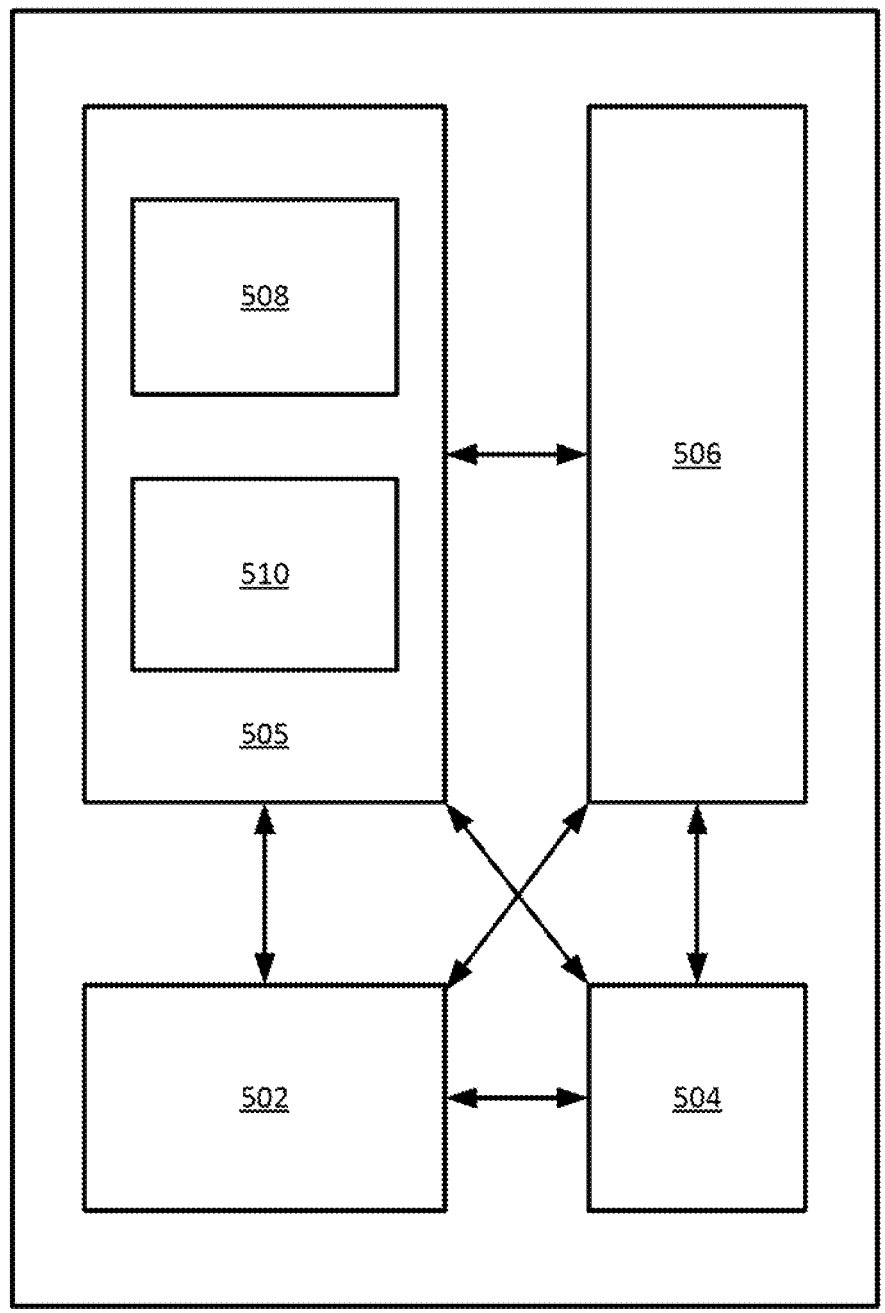
FIG. 5 depicts a high-level block diagram of an example computer that can be transformed into a machine capable of performing the functions described herein.

FIG. 5 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to verify the measurement accuracy of a non-contact thermal measurement device, as disclosed herein.

As depicted in FIG. 5, the computer 500 comprises a hardware processor element 502, e.g., a central processing unit (CPU), a microprocessor, or a multi-core processor, a memory 504, e.g., random access memory (RAM) and/or read only memory (ROM), a module 505 for verifying the measurement accuracy of a non-contact thermal measurement device, and various input/output devices 506, e.g., storage devices, including but not limited to, a tape drive, a floppy drive, a hard disk drive or a compact disk drive, a flash drive, a receiver, a transmitter, an output port, an input port, and a user input device, such as a keyboard, a keypad, a mouse, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 505 for verifying the measurement accuracy of a non-contact thermal measurement device, e.g., machine readable instructions can be loaded into memory 504 and executed by hardware processor element 502 to implement the blocks, functions or operations as discussed above in connection with the methods 300 and 400. For instance, the module 505 may include a plurality of programming code components, including an lookup component 508 and a comparison component 510. These programming code components may be included, for example, on a system-on-chip that controls a system similar to the system 100 illustrated in FIG. 1.

The lookup component 508 may be configured to determine the heat that is emitted by the emitter face 104 of the system 100 when the emitter face is heated to a known temperature. For instance, the lookup component 508 may determine the heat emitted by looking it up in a lookup table. For instance, the lookup component 508 may control at least some of the functions discussed above with respect to block 304 of the method 300.

The comparison component 510 may be configured to determine whether a non-contact thermal measurement device is functioning properly, based on a comparison of an actual thermal measurement made by the non-contact thermal measurement device to an expected thermal measurement (e.g., a thermal measurement that the non-contact thermal measurement device is expected to make). The comparison component 510 may be further configured to generate an alert when the non-contact thermal measurement device is not functioning properly, so that the non-contact thermal measurement device can be repaired and/or cleaned. For instance, the comparison component 510 may control at least some of the functions discussed above with respect to blocks 306-310 of the method 300.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 405 for verifying the measurement accuracy of a non-contact thermal measurement device, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
a non-resistive heat source;
a thermally conductive face having a controlled long-wave infrared emissivity, wherein the thermally conductive face is in thermal contact with the non-resistive heat source; and
a temperature detector positioned to detect a temperature of the thermally conductive face.

2. The apparatus of claim 1, wherein the non-resistive heat source comprises a transistor.

3. The apparatus of claim 1, wherein the thermally conductive face comprises an aluminum plate that has been coated with a layer of material having a known emissivity.

4. The apparatus of claim 1, wherein the controlled long-wave infrared emissivity is diffuse and uniform across an entire surface of the thermally conductive face.

5. The apparatus of claim 1, further comprising:
a printed circuit board positioned to support the non-resistive heat source and the temperature detector; and
a thermally conductive interface positioned between the thermally conductive face and the printed circuit board.

6. The apparatus of claim 5, wherein the thermally conductive interface is electrically non-conductive.

7. The apparatus of claim 5, further comprising:
a spacer positioned to hold the thermally conductive face flat above the printed circuit board.

8. The apparatus of claim 1, wherein the apparatus is deployed within a three-dimensional printer.

9. A method, comprising:
determining an expected value describing heat emitted by an emitter face having a known emissivity, based on a measurement of a temperature of the emitter face;
comparing a measurement taken by a non-contact thermal measurement device to the expected value; and
determining, based on the comparing, whether the non-contact thermal measurement device is functioning properly.

10. The method of claim 9, further comprising:
heating the emitter face to a setpoint using a non-resistive heat source, prior to the determining the expected value.

11. The method of claim 9, wherein the determining whether the non-contact thermal measurement device is functioning properly comprises:
concluding that the non-contact thermal measurement device is functioning properly when the measurement taken by a non-contact thermal measurement device is within a predefined variance of the expected value.

12. The method of claim 9, wherein the determining whether the non-contact thermal measurement device is functioning properly comprises:
concluding that the non-contact thermal measurement device is not functioning properly when the measurement taken by a non-contact thermal measurement device is not within a predefined variance of the expected value.

13. A non-transitory machine-readable storage medium encoded with instructions executable by a processor, the machine-readable storage medium comprising:
instructions to determine an expected value describing heat emitted by an emitter face having a known emissivity, based on a measurement of a temperature of the emitter face;
instructions to a measurement taken by a non-contact thermal measurement device to the expected value; and
instructions to determine, based on the comparing, whether the non-contact thermal measurement device is functioning properly.

14. The non-transitory machine-readable storage medium of claim 13, wherein the instructions to determine whether the non-contact thermal measurement device is functioning properly comprise:
instructions to conclude that the non-contact thermal measurement device is functioning properly when the measurement taken by a non-contact thermal measurement device is within a predefined variance of the expected value.

15. The non-transitory machine-readable storage medium of claim 13, wherein the instructions to determine whether the non-contact thermal measurement device is functioning properly comprises:
instructions to conclude that the non-contact thermal measurement device is not functioning properly when the measurement taken by a non-contact thermal measurement device is not within a predefined variance of the expected value.

* * * * *